Patented Nov. 18, 1924.

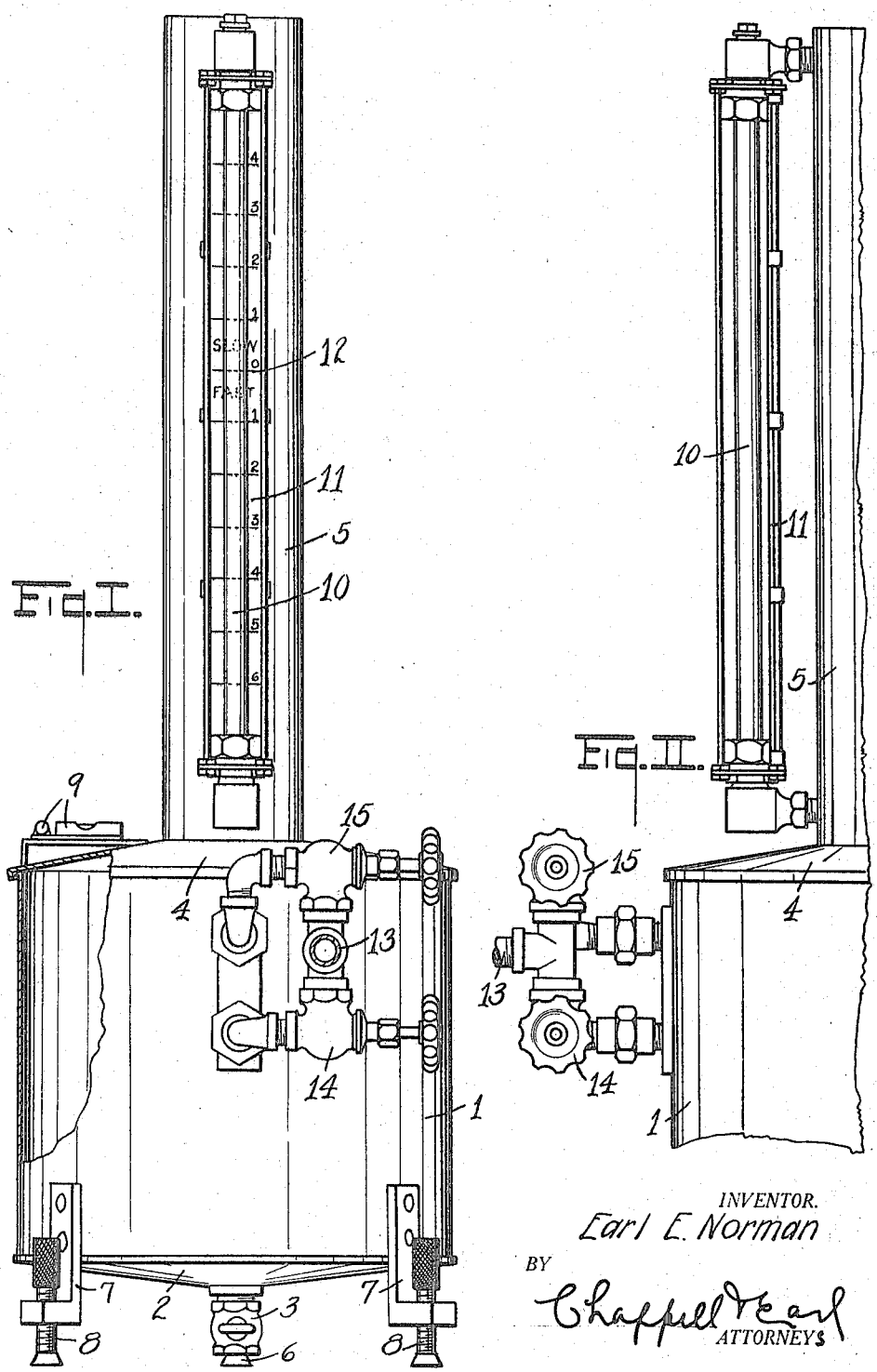

1,515,746

UNITED STATES PATENT OFFICE.

EARL E. NORMAN, OF KALAMAZOO, MICHIGAN.

METER TESTER.

Application filed September 30, 1922. Serial No. 591,523.

*To all whom it may concern:*

Be it known that I, EARL E. NORMAN, a citizen of the United States, residing in the city and county of Kalamazoo, State of Michigan, have invented certain new and useful Improvements in Meter Testers, of which the following is a specification.

This invention relates to improvements in meter testers.

The main objects of the invention are:

First, to provide an improved meter tester for water meters which enables the effective testing of the meter without disconnecting the meter from the service.

Second, to provide an improved meter tester which is compact and easily portable so that it may be readily transported from house to house and also may be operated by comparatively unskilled workmen.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a front elevation of my improved meter tester, a portion of the receptacle being broken away to better illustrate the structure thereof.

Fig. II is a fragmentary side elevation looking from the right of Fig. I.

Referring to the drawing, my improved meter tester comprises a gage receptacle 1 which is preferably provided with a concave bottom 2 having a drain cock 3 at the lowest point thereof so as to insure the draining of all the water from the receptacle. The top 4 of the receptacle is convexed and has a tubular extension or gage tube 5 projecting from the crown thereof. The convexed top avoids the forming of air pockets and when the receptacle is filled all the air is driven out and the cubic contents of the measured liquid are, therefore, not varied, as would be the case were air pockets present.

The receptacle is provided with three legs 6 and 7, the legs 7 being provided with means 8 for leveling the receptacle. The spirit levels 9 are mounted on the top of the receptacle, these levels being mounted at right angles to each other so that the leveling may be very rapidly accomplished by the adjusting of the screws 8. A gage glass 10 is mounted on the gage tube 5 and is provided with an indicia member 11 having two sets of indicia reading oppositely from the zero point 12. The inlet 13 is provided with valves 14 and 15, these valves being of different capacities, that is, their orifices differ so that water may be admitted rapidly or slowly.

In using the gage two operators are required. The gage is first positioned near a cock to be connected thereto as by means for a rubber hose or the like and properly leveled. The drain cock 3 should be opened to insure that the gage receptacle is completely drained. One operator is then positioned at the meter to read the same and signal the other operator when ready as, for instance, by tapping on the pipes where the operators are separated considerable distances. The operator at the gate opens the valve, having the larger capacity, as 14, and when the meter registers one cubic foot, the operator at the meter signals the operator at the tester who shuts off the water. The operator at the tester then notes the level of the water in the gage glass, 10, and reads from the scale behind the glass the accuracy of the meter in per cent fast or slow. The water is then drained from the tester and the test repeated using the valve with the smaller opening 15. In this latter test the meter moves very slowly such as would be occasioned by dripping of the faucet or a small leak; while in the former test the meter moves with approximately the same speed as would be occasioned by the ordinary use of a faucet, thus we are able to test the meter under the two most usual conditions obtaining with ordinary water meters.

I have found in actual practice in testing meters on city water supply that the work can be very rapidly accomplished and also with a very satisfactory degree of accuracy.

I have illustrated and described my improvements in the form in which I have embodied them in practice. I have not attempted to illustrate or describe certain modifications and adaptations which I contemplate as I believe the disclosure made will enable one to embody or adapt the same as may be desired.

Having thus described my invention, what I claim as new and desire to secure by Letters Patent, is:

1. In a meter tester, the combination with a gage receptacle having a concave bottom provided with a drain cock at the lowest point thereof, and a convex top having a tubular extension projecting from the crown thereof, a gage glass on said extension having two sets of oppositely reading gage indicia associated therewith, an inlet connection for said receptacle provided with valves of different capacities, a pair of spirit levels mounted on said receptacle at right angles to each other, and legs for said receptacle, at least two of said legs being provided with adjusting screws.

2. In a meter tester, the combination with a gage receptacle having a concave bottom provided with a drain cock at the lowest point thereof, and a convex top having a tubular extension projecting from the crown thereof, a gage glass on said extension having two sets of oppositely reading gage indicia associated therewith, an inlet connection for said receptacle provided with valves of different capacities, and means for leveling said receptacle.

3. In a meter tester, the combination with a gage receptacle having a concave bottom provided with a drain cock at the lowest point thereof, and a convex top having a tubular extension projecting from the crown thereof, a gage glass on said extension having gage indicia associated therewith, a valved inlet connection for said receptacle, a pair of spirit levels mounted on said receptacle at right angles to each other, and legs for said receptacle, at least two of said legs being provided with adjusting screws.

4. In a meter tester, the combination with a gage receptacle having a concave bottom provided with a drain cock at the lowest point thereof, and a convex top having a tubular extension projecting from the crown thereof, a gage glass on said extension having gage indicia associated therewith, and a valved inlet connection for said receptacle.

5. In a meter tester, the combination with a gage receptacle having a gage tube projecting from the top thereof, a gage glass on said tube having oppositely reading gage indicia associated therewith, an inlet connection for said receptacle provided with valves of different capacities, and leveling means for said receptacle comprising legs provided with adjusting screws.

6. In a meter tester, the combination with a gage receptacle having a gage tube projecting from the top thereof, a gage glass on said tube having oppositely reading gage indicia associated therewith, and an inlet connection for said receptacle provided with valves of different capacities.

7. In a meter tester, the combination with a gage receptacle having a gage tube projecting from the top thereof and provided with a gage, a valved connection for said receptacle, and leveling means for said receptacle comprising legs provided with adjusting screws.

8. In a meter tester, the combination with a gage receptacle having a gage tube projecting from the top thereof and provided with a gage, and an inlet connection for said receptacle provided with valves of different capacities.

In witness whereof, I have hereunto set my hand and seal.

EARL E. NORMAN. [L. S.]